4 Sheets—Sheet 1.

J. F. WOOD & J. A. WILKISON.
Heating Apparatus for Barrel-Bodies.

No. 226,435. Patented April 13, 1880.

WITNESSES:

INVENTORS,
J. F. Wood and J. A. Wilkison,
BY
ATTORNEYS.

4 Sheets—Sheet 2.

J. F. WOOD & J. A. WILKISON.
Heating Apparatus for Barrel-Bodies.

No. 226,435.   Patented April 13, 1880.

WITNESSES:   INVENTORS.
J. F. Wood & J. A. Wilkison,
BY
ATTORNEYS.

4 Sheets—Sheet 3.

J. F. WOOD & J. A. WILKISON.
Heating Apparatus for Barrel-Bodies.

No. 226,435. Patented April 13, 1880.

Witnesses,

Inventors.
J. F. Wood & J. A. Wilkison,

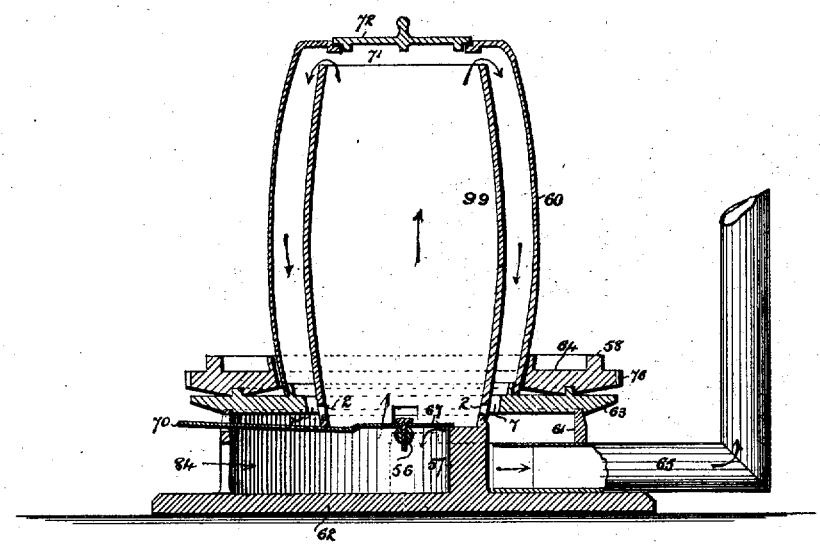
J. F. WOOD & J. A. WILKISON.
Heating Apparatus for Barrel-Bodies.
No. 226,435. Patented April 13, 1880.

UNITED STATES PATENT OFFICE.

JAMES F. WOOD AND JOHN A. WILKISON, OF BROOKLYN, NEW YORK.

HEATING APPARATUS FOR BARREL-BODIES.

SPECIFICATION forming part of Letters Patent No. 226,435, dated April 13, 1880.

Application filed December 29, 1879.

*To all whom it may concern:*

Be it known that we, JAMES F. WOOD and JOHN A. WILKISON, of the city of Brooklyn, county of Kings, and State of New York, have invented certain new and useful Improvements in Heating Apparatus for Drying or Seasoning Barrel-Bodies, of which the following specification, when taken in connection with the accompanying drawings, is such a full, clear, and exact description as will enable others skilled in the art to make and use the same.

Figure 1:
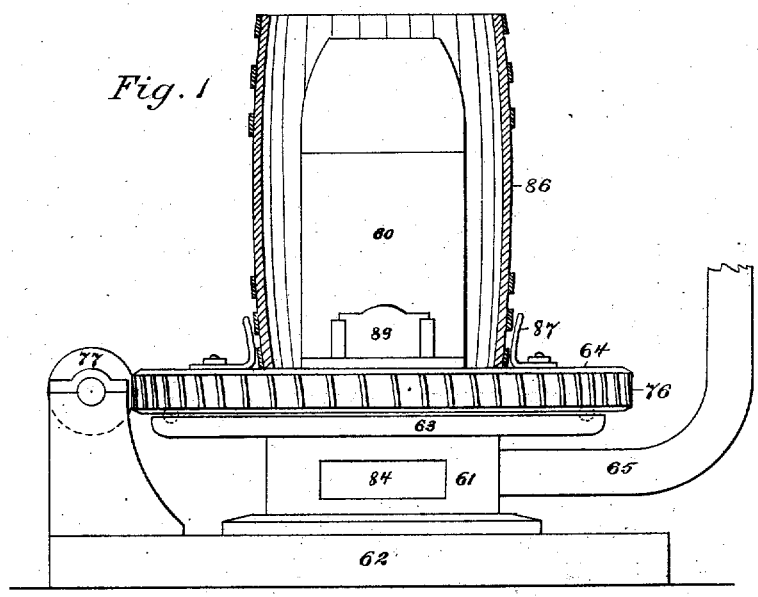
Figure 2:
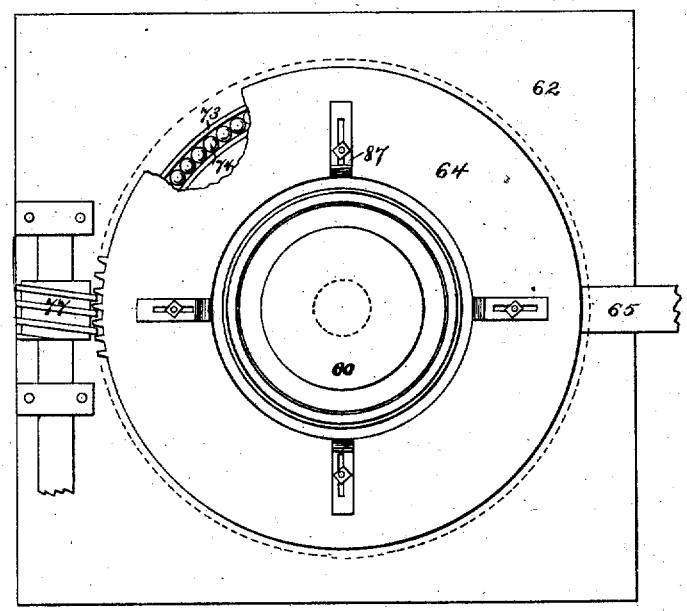
Figure 3:
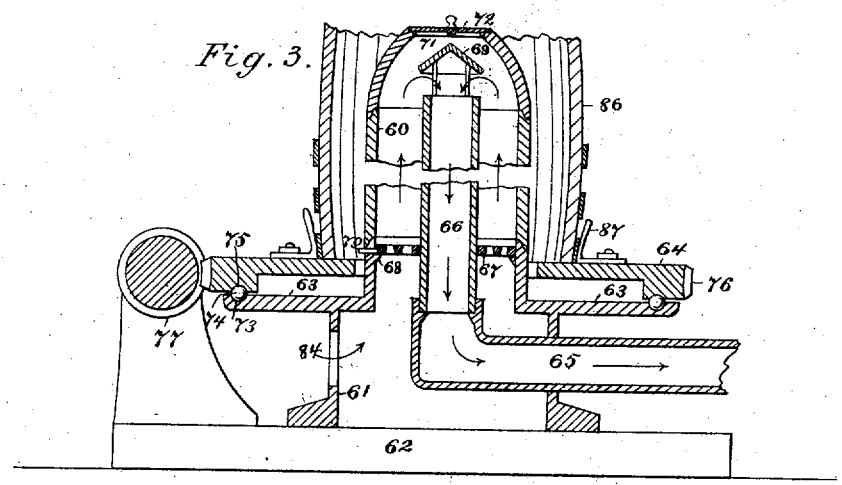
Figure 4:
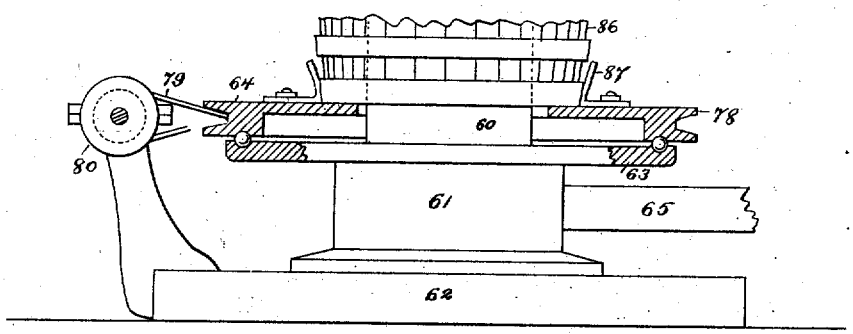
Figure 5:
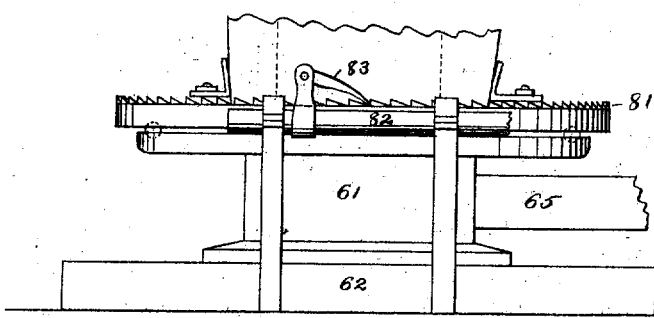
Figure 6:
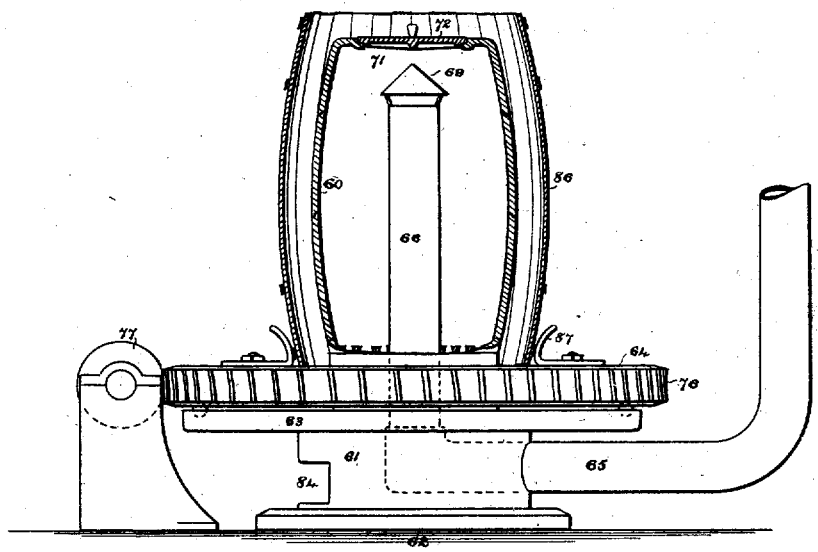

In the said drawings my improved apparatus is illustrated in Figure 1 by a side elevation, in Fig. 2 by a plan view, in Fig. 3 by a broken sectional elevation, in Fig. 4 by a broken side elevation, partly in section, in Fig. 5 by a broken side elevation, in Fig. 6 by a side elevation, partly in section, in Fig. 7 by a sectional elevation, and in Fig. 8 by a plan view of the base of the apparatus with the top plate removed.

In forming barrel-bodies of staves a suitable number to produce a given size of barrel are first assembled by being set up in cylindrical form by hand in trussing-hoops. Such a body then has its ends evened and its truss-hoops driven far enough upon its staves toward the center of its body to compress the staves tightly enough together to undergo the crozing, howeling, and chamfering operation and to receive their permanent hoops; but before these last-named operations are performed or the permanent hoops are applied the set-up barrel-body requires to be properly dried or seasoned by heating, in order that it may retain the form into which its staves have been forced, and so that when finished to receive its heads and permanent hoops it may not warp or twist by undue shrinkage. The heating, in order to be effective in its results, must necessarily be even and continuous, and therefore should be applied with such regularity that all parts of the barrel-body are affected alike.

It is to the accomplishment of this regular and even heating of the barrel-body that my invention is directed, which invention consists in an improved heating apparatus, in the main constituted by a revolving barrel-body-sustaining platform or table and a stationary stove of the requisite form to receive the barrel-body over it. Said invention, however, comprehends guides for centering the barrel-body, a peculiar structure of stove, means for rotating the platform or table, and combinations of parts, all too fully hereinafter described to need preliminary explanation.

This apparatus comprises the following principal elements, viz: a stove, within which the heat is generated, and a platform or table for sustaining the barrel-body and moving it to properly present the barrel-body to the heat-radiating surface of the stove.

This stove consists of a sheet-metal or cast-iron cylindrical body, 60, which is supported upon a base, 61, rising from a bed-plate, 62. This base 61 is provided with a right-angularly flanged top plate, 63, of such dimensions and shape as adapt it to support the table 64, and at suitable points it is perforated to provide draft-openings 84.

A draft-pipe, 65, leading to a chimney, projects through the base and turns at right angles to receive and support an extension or flue pipe, 66, that stands within the stove, and concentric, or nearly so, with the walls of its body 60. This flue-pipe 66 passes through a grate, 67, with which the stove is supplied at a point near its bottom, and is provided at its upper end with a hood, 69. This grate 67 is movably supported on a ledge, 68, provided for that purpose, and has an arm, 70, projecting through the walls of the body 60 at one side, whereby it may be vibrated slightly with the body of the stove and flue-pipe for its guides to discharge the ashes from the fire.

The upper end of the stove has an appropriate feeding-opening, 71, that is protected by a cover, 72.

The flanged top plate, 63, is provided with a circular seat, 73, Fig. 2, in which a number of friction-balls, 74, are placed, and the table 64 is similarly provided with a circular seat, 75, adapted to rest upon said friction-balls, whereby said table may be rotated with the middle of the stove as its center of motion, the table having a circular central opening spanning said stove.

In place of this construction the table may rest and move upon a circular ledge projecting from the flanged top plate, 63, and entering a circular seat in the under side of the table, or vice versa.

This table may be rotated by many means, as follows: It may have a toothed perimeter in the form of a worm-wheel, as 76, engaging a worm, 77, mounted in suitable bearings and properly revolved. Its perimeter may be grooved to form a pulley-rest, as 78, which a driving-band, as 79, connects with a driving-pulley, as 80. Its upper external edge may have a circular rack-bar, 81, engaged and driven by a pawl, 83, that is carried by a shaft, 82, properly reciprocated.

The fuel for the fire in the stove is introduced through the opening 71 and is deposited upon the grate 67, the hood 69 preventing said fuel from falling into the flue-pipe 66. The air promoting combustion enters the openings 84, passes through the stove 59, and thence down the flue-pipe 66 and out to the chimney through the draft-pipe 65, in the directions indicated by the arrows in Fig. 7.

As all fires burn irregularly, it is necessary, in order to subject all parts of the barrel-body to a regular degree of heat, that said barrel-body shall be slowly revolved about the stove, and thus be presented to and at all points alike. The barrel-body 86 is therefore set upon the table 64, so as to stand over the stove, and is supported equidistant therefrom by means of radially-adjustable centering-guides 87, projecting from said table. The table, being set in motion, carries the barrel-body slowly about the stove, the heat of which regularly and evenly dries the same.

A regulating-draft for the fire may be obtained by a sliding door, 89, at one side of the stove.

The stove-body may, of course, be built up of sections, as in Figs. 3 or 6, where several sections of proper form rest one upon another.

Barrels are commonly of bilge form—that is, their staves are bent into concavo-convex form, whereby their central portions stand considerably out of a plane passing through their ends. This form therefore presents the end portions of the barrel-body nearer to a stove having straight sides than it does its middle body portions. The result of this is, that the middle portions of the barrel are not subjected to as great a heat as are its ends, and imperfect results are obtained.

To remedy such defect I construct my stove with a body, 60, presenting a bilge form, coinciding, at least approximately, with that of the barrel-body, as in Figs. 6 and 7, whereby the barrel-body, when placed over the stove, stands equidistant from the stove-body at all points, and a perfectly-even drying is the result.

In the apparatus illustrated in Figs. 7 and 8 the structure is somewhat modified.

The base 61 is provided interiorly with a curved wall, 57, that starts from the base 61 at one side of the draft-opening 84, and joins the base 61 at the opposite side of the draft-opening, it being curved to form a circular seat for the cylinder 99, that constitutes the inner chamber of the stove, at the bottom of which chamber the grate 57 is supported upon a bridge-bar, 56, that is seated in the base 61, and to which bar the grate is pivoted, so that it may be oscillated by its handle 70.

The inner cylinder, 99, of the stove passes through a central opening in the flanged top plate, 63, and is secured upon the circular wall 57 over the grate 67. It is provided with air-openings 2 near its lower end, and will preferably be composed of cast metal and be of bilge form.

The body 60 of the stove, composed of sheet metal, is made in bilge form, so that its walls stand concentric with those of the body 59. It is secured upon a flange or otherwise to the top plate, 63, and at its upper end its walls are contracted to overhang the upper end of the body 59 and provide the feeding and cover-receiving opening 71.

The pipe 65 is branched within the chamber 40, formed between the base 61 and curved walls of the cylinder 99, so that it has three induction-orifices, 4 5 6.

The table or platform 64 is provided with a flange, 58, which will properly guide the barrel-body rested upon it and support it in proper relation to the stove.

The fire built upon the grate 67 receives its draft through the opening 84 and the perforations in the grate, and the products of combustion pass upward through the cylinder 99 and downward between it and the body 60, thence into the chamber 40 through the circular passage 7, formed between the edge of the opening in the top plate, 63, and the walls of the cylinder 99. From the chamber 40 they are carried through the openings 4 5 6 into the pipe 65 and discharged. This structure has been found to be an advantageous one, promoting a perfect combustion and causing a regular radiation of heat from the body 60 of the stove.

What is claimed is—

1. A barrel-body-heating apparatus consisting, essentially, of a revolving barrel-sustaining platform and a stationary stove of form similar to that of the barrel-body, so as to receive the same over it, substantially as shown and described.

2. In a barrel-heating apparatus, the revolving barrel-sustaining platform 64 and a stove having a bilge form, as in Figs. 6 and 7, whereby the sides of the barrel-body are supported equidistant from the stove at all points and an even drying of its surfaces is effected, substantially as shown and described.

3. The combination of the adjustable guides 87 with the platform or table 64 and stove 60, substantially as described.

4. The combination, with the stationary stove, of the table 64 and the described means for rotating the same, substantially as shown and described.

The combination of the base 61, having a flange, 63, table 64, stove 60, and devices for revolving said table, substantially as described and shown.

6. The combination, with the cylinder 99 and stove-body 60, of the base 61, the curved walls 57, and top plate, 63, having a central opening providing the passages 7, substantially as described.

In testimony whereof we have signed our names to this specification in the presence of three subscribing witnesses.

JAMES F. WOOD.
JOHN A. WILKISON.

Witnesses:
JOHN FULLERTON,
RICHARD BOLGER,
C. W. WILSON.